Figure 1:
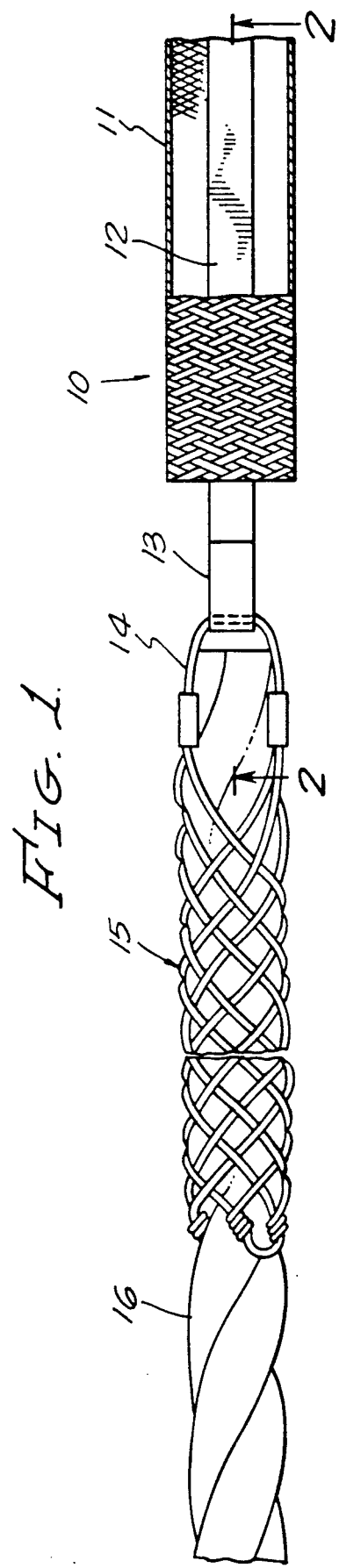

United States Patent [19]

Plummer

[11] Patent Number: 5,038,663
[45] Date of Patent: Aug. 13, 1991

[54] BRAIDED SLEEVING WITH PULL CORD

[76] Inventor: Walter A. Plummer, 3546 Crownridge Dr., Sherman Oaks, Calif. 91403

[21] Appl. No.: 532,708

[22] Filed: Sep. 16, 1983

[51] Int. Cl.$^5$ .............................. D04C 1/12
[52] U.S. Cl. ................................ 87/6; 29/234; 87/9
[58] Field of Search ........................ 87/5-9, 87/11, 13, 29; 29/234, 235, 241, 433, 728, 820, 464; 254/134.3 R, 134.3 FT, 134.4

[56] References Cited

U.S. PATENT DOCUMENTS

| 201,096 | 3/1878 | Cowles | 29/234 |
|---|---|---|---|
| 1,721,155 | 7/1929 | Johnson | 29/234 |
| 1,949,298 | 2/1934 | Fabel | 29/464 |
| 2,112,281 | 3/1938 | Ferris | 87/9 X |
| 2,164,278 | 6/1939 | Kellems | 87/9 X |
| 2,261,775 | 11/1941 | Mosier et al. | 29/234 |
| 2,359,532 | 10/1944 | Searle | 29/234 |
| 2,426,401 | 8/1947 | Mack | 29/234 |
| 2,549,382 | 4/1951 | Mitterway | 87/6 |
| 2,823,153 | 2/1958 | Bunnell et al. | 29/234 X |
| 2,936,257 | 5/1960 | Nailler et al. | 87/9 X |
| 3,102,715 | 9/1963 | Weitzel et al. | 87/9 X |
| 3,133,725 | 5/1964 | Lanum | 87/6 X |
| 3,287,194 | 11/1966 | Waddell, Jr. | 87/6 X |
| 3,452,639 | 7/1969 | Passman | 87/6 |
| 4,258,608 | 3/1981 | Brown | 87/6 |

FOREIGN PATENT DOCUMENTS

| 159923 | 4/1983 | German Democratic Rep. | 254/134.3 FT |
|---|---|---|---|
| 1318415 | 5/1973 | United Kingdom | 254/134.3 FT |

Primary Examiner—Daniel P. Stodola
Attorney, Agent, or Firm—Christie, Parker & Hale

[57] ABSTRACT

This invention relates to protective and appearance sleeving, and more particularly to improved expandable-contractible braided sleeving having a pull cord extending lengthwise of its interior one end of which is attachable to an object to be enshrouded while the sleeving is being assembled thereover. The pull cord may comprise a strip of high strength material imprintable with indicia.

8 Claims, 1 Drawing Sheet

U.S. Patent   Aug. 13, 1991   5,038,663

BRAIDED SLEEVING WITH PULL CORD

BACKGROUND OF THE INVENTION

Braided sleeving is utilized in a wide variety of designs and patterns to enshroud enlongated objects to serve many different functions. Such sleeving is readily expanded in girth to facilitate the assembly operation and to accommodate a range of different cross sectional sizes of objects to be enshrouded the sleeving being thereafter contractible into a snug fit with the object. However, the assembly operation is greatly handicapped owing to the need to apply axial compressive forces to the sleeving to expand it while at the same time applying tension to advance it over the object. It is at once apparent that axial compression of the sleeving to expand it involves the need to push the forward end rearwardly while at the same time applying a pulling force to advance it over the object being enshrouded.

SUMMARY OF THE INVENTION

The aforementioned problems associated with the assembly of braided sleeving over elongated objects is circumvented by the present invention in which the sleeving, as manufactured, is provided with a pull cord the advance end of which is securable about the object whereby a pulling force applied to the other end of the pull cord is effective to pull the object into the sleeving. In consequence the assembly of the sleeving to the object being enshrouded is greatly expedited. Preferably, but not necessarily, the pull cord comprises a tape to provide maximum strength with minimum thickness.

Accordingly, it is a primary object of this invention to provide an improved braided sleeving product and method of assembling the same over an elongated object to be enshrouded.

Another object of the invention is the provision of expandable-contractible braided sleeving with a pull cord installed interiorly thereof and a method of utilizing the pull cord to expedite assembly of the sleeving over an object.

Another object of the invention is the provision of expandable contractible braided sleeving having a pull cord strip extending loosely therealong imprintable with indicia.

These and other more specific objects will appear upon reading the following specification and claims and upon considering in connection therewith the attached drawing to which they relate.

Figure 2:
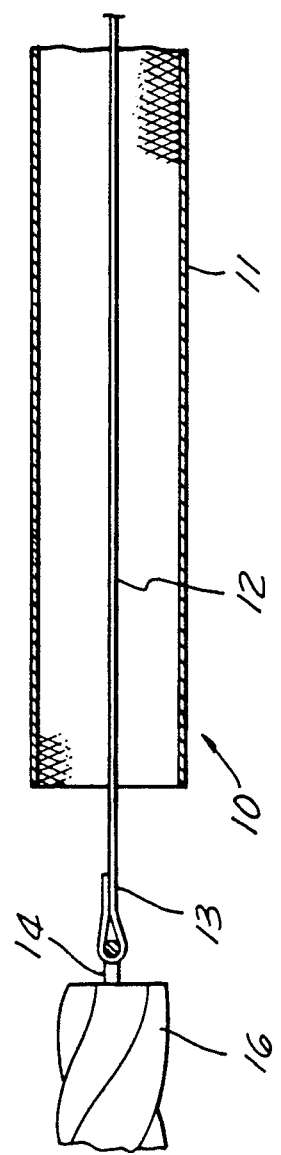

Referring now to the drawing in which a preferred embodiment of the invention is illustrated:

FIG. 1 is a longitudinal view showing one end of the invention braided tubing with the pull cord secured to one end of cabling or the like to be enshrouded by the sleeving; and FIG. 2 is a cross sectional view taken along line 2—2 on FIG. 1.

Referring to FIGS. 1 and 2, there is shown an illustrative embodiment of the invention braided tubing product designated generally 10 comprising an expandable-contractible braided sleeve 11 of any suitable construction well known to persons skilled in that art and a pull cord 12 extending the full length of the sleeving as manufactured. The opposite ends of cord 12 preferably extend beyond the ends of the sleeving in order that one end may be attached to the object to be enshrouded and that the other end can be attached to a handgrip or other means before applying tension to the cord. As herein shown by way of example, the advance end 13 of cord 12 is looped about the bail 14 of an expandable-contractable cable gripping device 15. Such grips are available in a wide range of sizes suitable for installation over the end of an object to be enshrouded such as the cabling of twisted conductors 16. Although conductors are there shown, it will be understood that these represent any of a wide range of objects which require protection or whose appearance would be enhanced by a sheath of braided sleeving.

Preferably but not necessarily, pull cord 12 comprises a strip of suitable high strength inexpensive material. One material found highly suitable is available from duPont under the trade name Tyvec. This is a non-woven fabric of randomly arranged plastic fibers of highly superior strength readily receptive of printed indicia. This material is light weight, very flexible and easily knotted or bonded to itself or to other material. Accordingly, end 13 of the pull cord strip can be threaded through the bail 14 of gripping device 15 and firmly secured thereto by knotting, bonding, stapling or the like. Alternatively, end 13 may be secured to bail 14 by a pair of self-gripping rings well known to persons skilled in that art.

The manner of using my improved braided sleeving will be readily apparent from the foregoing description of its features. One end, as end 13 of the pull cord 12, is firmly secured to the object 16 to be enshrouded. If cabling 16 is to be sheathed, a gripping device 15 is advantageously employed but any suitable anchorage may be used. The operator then proceeds to apply tension to the remote end of the pull cord while applying longitudinal compression force to the advance end of sleeve 11 effective to expand the sleeve girthwise to a diameter greater than the conductors 16. Thereupon the sleeving is easily telescoped over the conductors without impediment. When a desired length of the sleeving has been assembled in this manner, one end is secured to the conductors in the usual manner well known in this art and the remainder of the sleeving stretched out until firmly contracted snugly against the conductors and the free end is then secured in place. Gripping device 15 is of course removed along with the pull cord.

It will be understood that it may be desirable and advantageous, particularly in connection with sleeving employed for larger or heavier cabling, cordage, or the like, to provide an inexpensive light duty pull cord of sufficient strength to install a reusable substitute pull cord of requisite strength.

While the particular braided sleeving with pull cord herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. That method of expediting and facilitating the assembly of expandable-contractible braided sleeving over one or more electrical conductors which sleeving has been manufactured about a flexible pull cord extending from end to end thereof which method comprises:

utilizing a continuous length of said sleeving having said flexible pull cord accessible at the opposite ends of said sleeving;

anchoring one end of said pull cord to one end of said conductor or conductors; and applying tension to the other end of said pull cord whole holding the leading end portion of said sleeving expanded by axially contracting the same while proceeding to coaxially assemble said sleeving about said conductor or conductors.

2. That method defined in claim 1 characterized in the step of detaching said pull cord from said conductor or conductors after the assembly of said sleeving thereabout.

3. That method defined in claim 1 characterized in the step of applying tension to axially spaced apart portions of said sleeving after the assembly about said conductors thereby to contract the same into a snug fit about said conductor or conductors.

4. That method defined in claim 1 characterized in the steps of attaching one end of said pull cord to a heavy duty pull cord, and utilizing said pull cord to install a heavy duty pull cord into said sleeving for use in lieu of said first mentioned pull cord to advance said conductor or conductors progressively into said sleeving.

5. That method defined in claim 4 characterized in the step of detaching said heavy duty pull cord from said conductor or conductors after said sleeving has been installed thereabout for the subsequent reuse of said heavy duty pull cord in installing other braided sleeving over another object.

6. That method of expediting the assembly of expandable-contractible braided sleeving over an object which comprises:

utilizing a continuous length of said sleeving manufactured with a continuous length of a pull cord extending therethrough from end-to-end thereof;

attaching one end of said pull cord to said object to be enshrouded with said sleeving;

holding a leading end portion of said sleeving expanded girthwise while applying tension to said pull cord to telescope said sleeving and said object into coaxial assembly;

advancing the leading end of said sleeving telescopically along said object by applying tension to the leading end of said pull cord until a desired length of said object is enshrouded by said sleeving; applying tension to said sleeving after the assembly thereof about said object thereby contracting said sleeving simply against said object; and detaching said pull cord from said object.

7. That method of expediting the assembly of expandable-contractible braided sleeving over an object which comprises:

utilizing a continuous length of said sleeving manufactured with a continuous length of a pull cord extending therethrough from end-to-end thereof;

attaching one end of said pull cord to said object to be enshrouded with said sleeving;

advancing the leading end of said sleeving telescopically along said object by applying tension to the leading end of said pull cord until a desired length of said object is enshrouded by said sleeving;

detaching said pull cord from said object; and extending the opposite ends of said sleeving axially away from one another after the assembly thereof about said object until said sleeving is contracted snugly against the underlying surfaces of said object.

8. That improvement in expandable-contractible braided sleeving which comprises:

braided sleeving manufactured with a pull cord extending substantially the full length of the interior thereof with one end adapted to be anchored temporarily to one end of an object to be telescoped into said sleeving whereby a pulling force applied to the other end of said pull cord is effective to pull said object into said braided sleeving;

gripping means interconnecting said pull cord and said object and securable to one end of said object by embracing the end of said object for ready and quick assembly to one end of said object while in use to pull said object into said braided sleeving, and serving to pilot and center the adjacent end of said object generally coaxially of said sleeving while being pulled thereinto.

* * * * *